United States Patent [19]
Muller-Berner

[11] 3,817,121
[45] June 18, 1974

[54] SYNCHRONIZING INSTALLATION FOR CHANGE-SPEED TRANSMISSIONS

[75] Inventor: Alfred H. Müller-Berner, Waiblingen, Germany

[73] Assignee: Daimler-Benz Aktiengesellschaft, Stuttgart-Unterturkheim, Germany

[22] Filed: Apr. 12, 1971

[21] Appl. No.: 133,175

[30] Foreign Application Priority Data
Apr. 10, 1970 Germany.......................... 2017237

[52] U.S. Cl..................................... 74/645, 74/858
[51] Int. Cl....................... F16h 47/08, G05g 9/12
[58] Field of Search ............. 74/339, 846, 858, 645; 192/3 R, 32

[56] References Cited
UNITED STATES PATENTS

| | | | |
|---|---|---|---|
| 2,309,051 | 1/1943 | Dodge | 74/339 X |
| 2,361,127 | 10/1944 | Sampietro | 74/339 X |
| 2,499,128 | 2/1950 | Brunken | 74/858 |
| 2,619,848 | 12/1952 | Carnagua | 74/339 X |
| 2,709,926 | 6/1955 | Jandasek | 74/645 |
| 2,726,556 | 12/1955 | Greenlee | 74/645 |
| 2,895,571 | 7/1959 | Hanebeck | 192/3 R X |
| 2,952,346 | 9/1960 | Costa et al. | 74/339 X |
| 3,007,351 | 11/1961 | Hilpert | 74/731 X |
| 3,031,050 | 4/1962 | Williams | 192/3 R |
| 3,103,826 | 9/1963 | Jaeschke | 74/339 |
| 3,182,778 | 5/1965 | Droschel | 74/339 X |
| 3,313,181 | 4/1967 | Leonard et al. | 74/339 |
| 3,446,097 | 5/1969 | Schmidt et al. | 74/339 X |
| 3,478,851 | 11/1969 | Smyth et al. | 74/339 |
| 3,625,080 | 12/1971 | Rachel | 74/339 X |

*Primary Examiner*—Samuel Scott
*Assistant Examiner*—P. S. Lall
*Attorney, Agent, or Firm*—Craig and Antonelli

[57] ABSTRACT

A synchronization installation for shiftable change-speed transmissions, especially for motor vehicles, in which an electronic synchronization control unit adjustable by means of a preselector is provided that is equipped with rotational speed-measuring devices for the transmission members to be shifted and with devices for increasing or decreasing the rotational speed of the transmission elements to be shifted, and which is connected with shifting clutches by way of shifting devices that are actuated in case of rotational speed equality.

27 Claims, 1 Drawing Figure

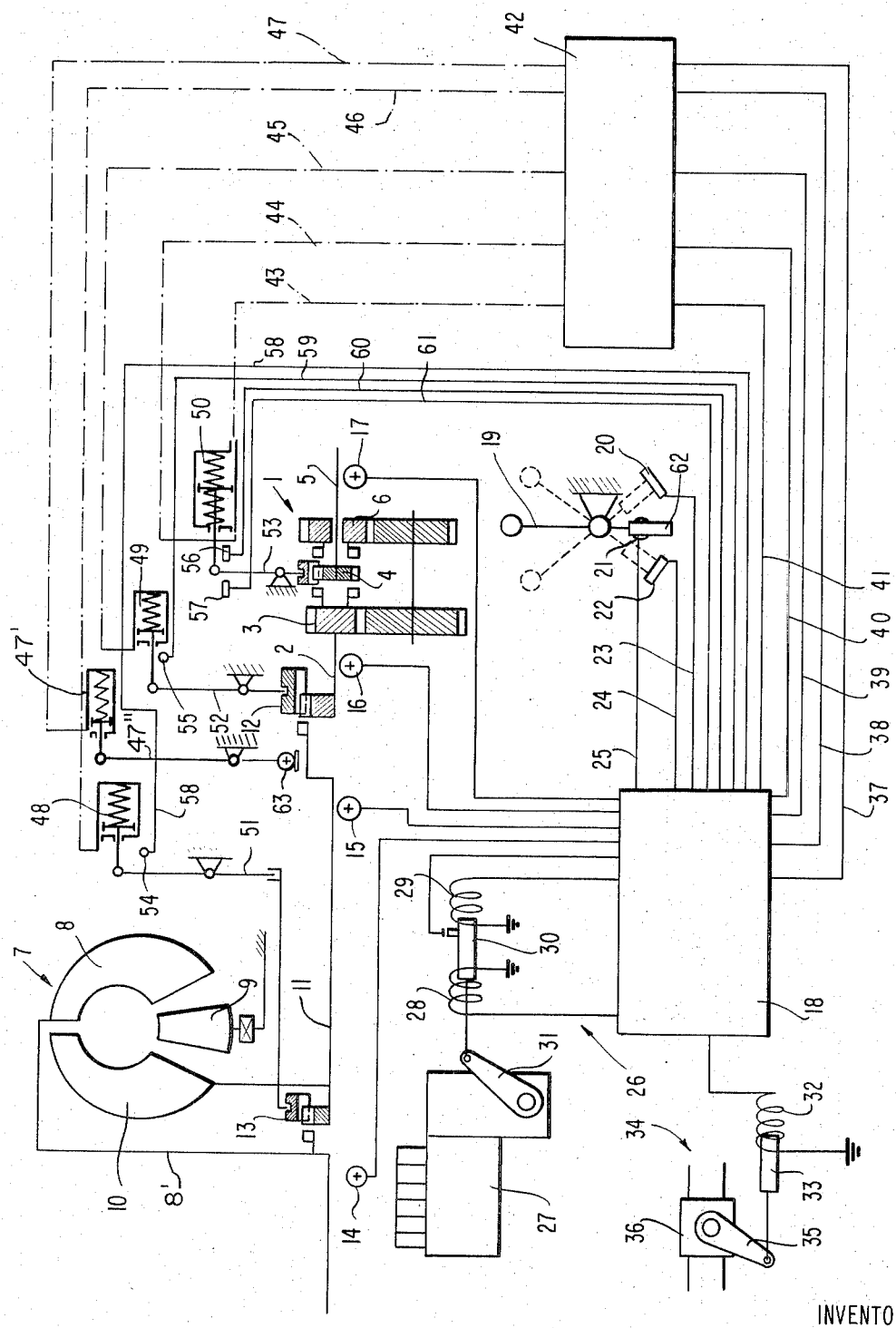

SYNCHRONIZING INSTALLATION FOR CHANGE-SPEED TRANSMISSIONS

The present invention relates to synchronization installation for shiftable change-speed gears, especially for motor vehicles.

It is at present still customary in part in connection with commercial types of vehicles to utilize change-speed transmissions that include form-locking shifting elements, for example, claw-clutches. In order to be able to carry out the form-locking shifting operation, the engine rotational speed has to be assiduously matched to the transmission output rotational speed during the shifting or engagement of the individual speeds either by giving gas or by mere waiting.

It is known in connection with modern motor vehicle transmissions to provide a mechanical synchronizing device which carries out the rotational speed adaptation of the corresponding transmission members by friction work, for example, in conical clutches. This construction requires a considerable expenditure and increases the over-all size of the change-speed transmission. Additionally, it is frequently the cause of failures or reductions in the length of life of the transmission. With the high engine outputs utilized to an ever-increasing extent and with the large masses connected therewith, the synchronizing work to be performed is very large so that frequently servo-devices have to be utilized for the assist, together with all the disadvantages of the technical metering of the synchronizing force. The large synchronizing work is conditioned primarily by the large lamellae of the known shifting clutches.

The present invention is concerned with the task to avoid these disadvantages and to provide a change-speed transmission of the aforementioned type which permits the use of simple, form-locking shifting elements, for example, of a claw-shifting mechanism. The present invention essentially consists in that an electronic synchronizing control unit adjustable by a preselector is provided which is equipped with rotational speed-measuring means for the transmission elements to be coupled and with means for increasing or decreasing the rotational speed of the transmission elements to be engaged, and which is connected with shifting clutches between the transmission elements by way of shifting devices that are actuated at rotational speed equality. It becomes possible thereby to completely dispense with large, expensive friction clutches prone to failures and limited in the length of life in the form of mechanical synchronizing means or friction pairings because the synchronization takes place by a corresponding influencing of the rotational speeds of the individual transmission elements.

According to a further, feature of the present invention to avoid the wear normally occuring with a lamellae clutch arrangement, a hydraulic torque converter may be connected in the input of the change-speed transmission.

For some shifting situations, particularly when starting from standstill, it is necessary that the transmission input shaft is brought to very small rotational speeds or to a rotational speed of zero. For that purpose, the turbine shaft of the hydraulic torque converter may be equipped with a band brake or the like which is actuatable from the synchronizing control device by way of the synchronization installation. In one embodiment according to the present invention, a rigid mechanical connection may exist between the turbine shaft and the transmission input shaft. The synchronizing control device determines the rotational speed equality or brings about the same by closing and opening of the band brake. In another embodiment of the present invention, a preferably form-locking clutch in provided between the hydraulic torque converter and the change-speed transmission. In lieu of the combination consisting of band brake and form-locking clutch, also a friction-locking clutch, for example, a lamellae clutch may be provided which is then directly controlled by the synchronizing control device.

According to the present invention to economize fuel the pump shaft and the turbine shaft of the hydraulic torque converter, which are both equipped with rotational speed-measuring devices, are adapted to be connected preferably by means of a shifting clutch which is actuatable from the synchronizing control device by way of the shifting installation. The shifting or engagement takes place at a predetermined engine rotational speed which is determined by both rotational speed-measuring devices.

In order to be able to influence the rotational speeds, it is advantageous if the synchronizing control device includes a preferably electromagnetic adjusting mechanism for the fuel supply of the combustion engine, preferably for the injection pump. The engine rotational speed can be increased or decreased with such an arrangement. Additionally, it is advantageous if the synchronizing control device is provided with a preferably electromagnetic adjusting mechanism for the engine brake of the combustion engine. Also with such an arrangement, the transmission input shaft can be braked and can be matched in its rotational speed to the transmission output rotational speed.

According to a further feature of the present invention, a servo-slide valve controlled by the synchronizing control unit may be provided as shifting installation which is connected with shifting levers of the shifting clutches by way of servo-pistons. Advantageously, the shifting levers may include check-back or answer-back contacts connected with the synchronizing control device for the engaged position. It is assured thereby that a shifting also takes place if, for example, the claw clutch utilized as shifting clutch is disposed with the teeth facing one another since with a missing check-back signal a new rotational speed adaptation is undertaken, during which a rotation of the teeth of the claw clutch with respect to one another then takes place.

A shifting lever provided with contacts may serve as preselector of the synchronizing control mechanism. It is possible thereby to realize both a stick-shift arrangement as also a steering wheel shifting arrangement. The shifting lever may advantageously abut in its center position at a contact of the synchronizing control mechanism opening in this position the shifting clutch by way of the shifting installation. Since the synchronizing control device is engaged in this position, a corresponding rotational speed adaptation takes place so that the tractive moment of the engine is approximately balanced and the form-locking shifting clutch can be disengaged.

Accordingly, it is an object of the present invention to provide a synchronizing installation for change-speed transmissions which avoids by simple means the aforementioned shortcomings and drawbacks encountered in the prior art.

Another object of present resent invention resides in a synchronizing installation for shiftable transmissions of motor vehicles which eliminates the cumbersome adaptation of the rotational speeds of the engine and transmission output shaft when engaging the various speeds.

Another object of the present invention resides in an automatic synchronizing installation for change-speed transmissions which is relatively simple, requires a relatively short structural length and assures long length of life of the various parts, particularly of the shifting elements.

A still further object of the present invention resides in a synchronizing installation for engageable change-speed transmissions which permits the use of simple form-locking shifting elements.

These and other objects, features and advantages of the present invention will become more obvious from the following description when taken in connection with the accompanying drawing which shows, for purposes of illustration only, one embodiment in accordance with the present invention, and wherein:

The single FIGURE is a schematic view of a synchronizing installation for a shiftable change-speed transmission in accordance with the present invention.

Referring now to the single FIGURE of the drawing, the change-speed transmission generally designated by reference numeral 1 illustrated in this embodiment only as an example, includes two speeds; namely, a direct speed in which the gear wheel 3 arranged on the transmission input shaft 2 can be clutched by way of a claw clutch 4 directly with the output shaft 5 and a speed-reducing speed, in which the other side of the claw clutch 4 couples the output shaft with a speed-reducing counter-shaft gearing coordinated to the transmission input shaft 2, which includes a gear wheel 6 loosely mounted on the output shaft 5. The drive takes place from an internal combustion engine (not shown). A hydraulic torque converter generally designated by reference numeral 7 is arranged between the internal combustion engine and the shiftable change-speed transmission 1, whose pump section 8 is operatively connected with the engine shaft whereas the turbine section 10 following the fixed stator 9 is connected with the transmission input shaft 2. A further clutch 12 is provided between the transmission input shaft 2 and the turbine shaft 11 which is also constructed as a form-locking claw clutch. The clutch 12 may also be dispensed with in another type of construction of the present invention. Therebeyond, a third claw clutched 13 is provided which is able to connect the pump shaft 8' with the turbine shaft 11 of the hydraulic torque converter 7.

Rotational speed-measuring devices 14, 15, 16 and 17 of any conventional construction are connected with the drive shaft of the engine or the pump shaft of the hydraulic torque converter 7, with the turbine shaft 11 of the hydraulic torque converter 7, with the transmission input shaft 2 and with the transmission output shaft 5, respectively, which are connected with an electronic synchronizing control device 18 of any conventional construction. The synchronizing control device 18 includes a preselector 19 constructed as shifting lever, which is connected by way of contacts 20, 21 and 22 and by way of corresponding lines 23, 24 and 25 with the electronic synchronizing control device 18. The electronic synchronizing control device 18 additionally includes an adjusting mechanism generally designated by reference numeral 26 for the injection pump 27 of the internal combustion engine (not shown), which consists of two coils 28 and 29 and which is able to adjust the adjusting lever 31 of the injection pump 27 by way of an electromagnet 30. The synchronizing control device 18 includes a further adjusting mechanism generally designated by reference numeral 34 and consisting of a magnet coil 32 and of a magnet 33, which is connected by way of a lever 35 with the conventional engine brake 36 of the internal combustion engine (not shown).

The synchronizing control unit 18 is connected by way of the lines 37, 38, 39, 40 and 41 with a servo-slide valve 42 of conventional construction to which are coordinated by way of further hydraulic or pneumatic lines 43, 44, 45, 46 and 47, servo-pistons 47', 48, 49 and 50 which are adjustable either hydraulically or pneumatically. The servo-piston 47' is intended for the selective actuation of auxiliary brake 63 via shifting lever 47''. These servo-pistons 48, 49 and 50 are intended for the actuation of the shifting clutches 4, 12 and 13 and are connected with the latter by way of shifting levers 51, 52 and 53, respectively. The shifting levers 51, 52 and 53 of the shifting elements 4, 12 and 13 abut in their engaged positions at contacts 54, 55, 56 and 57 which serve for an answer-back or check-back and for that purpose are connected by way of lines 58, 59, 60 and 61 with the synchronizing control device 18, to which they indicate which position they assume. Since the shifting clutch 4 includes two engaged positions, it is equipped correspondingly also with two check-back or answer-back contacts 56 and 57.

For purposes of starting the engine, appropriately the shifting elements 13 and, if present, also 12, are opened, i.e., disengaged, which can be effected in a conventional manner by the starter switch, insofar as they are not already opened for other reasons. Thereafter, the engine can be started with the vehicle standing still, whereby the turbine shaft 11 is driven with a slight slippage by the pump 8. The power flow can be interrupted in the shifting element 12 constructed as claw clutch or, in a further embodiment, if the turbine shaft 11 is mechanically rigidly connected with the transmission input shaft 2, by means of the band brake 63. For starting, as is customary, a speed, for example, the first speed, has to be engaged by means of the shifting lever 19, which takes place by shifting the shifting lever 19 that can be kept small. As a result thereof, at the shifting lever end 62 the contact 20 of the line 23 leading to the synchronizing control device 18 is closed which thus receives a shifting command. The synchronizing control device 18 examines by means of the rotational speed-measuring devices 16 and 17, the rotational speed of the transmission input shaft 2 and the rotational speed of the output shaft 5, taking into consideration the constant transmission speed reduction. With equality of the rotational speed, which exists in the case of starting since both possess the rotational speed of zero, the synchronizing control device 18 produces by way of the line 41 a signal to the servo-slide valve 42. Pressure is supplied by the servo-control slide valve 42 by way of a hydraulic or pneumatic line 43 to the servo-piston 50 which then carries out the engagement of the first speed by way of the shifting lever 53 at the shifting clutch 4. Simultaneously therewith, the servo-slide valve 42 relieves the line 44. The check-back contact 57 indicates to the synchronizing control device 18 by way of the associated line 61, the completion of the shifting operation in the claw clutch 4. The latter thereupon adjusted by way of the adjusting device 26, the injection pump 27 of the combustion engine to idling and tightens the auxiliary brake 63, for example, a band brake, arranged on the turbine shaft after it has given a signal to the servo-slide valve 42 which converts the same by way of a hydraulic or pneumatic line 47 into a movement of the auxiliary brake 63. As a result thereof, the slight idling torque of the turbine 10 of the hydraulic torque converter 7 is braked and therewith the turbine shaft 11 is stopped. Since the rotational speed-measuring devices 15 and 16 now indicate the same rotational speed; namely, zero, also the engagement of the claw 12 can be carried out. For that purpose, the servo-slide valve 42 receives a signal by way of the line 39 which it converts by way of the line 45 into an actuation of the servo-piston 49 and therewith of the shifting lever 52.

If the clutch 12 is omitted, then the auxiliary brake 63 has to be tightened prior to the speed engagement by means of the claw clutch 4.

In case the shifting operation cannot be carried out in the claw clutch 4 of the change-speed transmission 1, i.e., no check-back takes place by way of the check-back contact 57, because, for example, tooth stands on tooth in the claw clutch 4, then the synchronizing control device 18 actuates in the described manner the auxiliary brake 63 and the claw clutch 12 or in another embodiment only the auxiliary brake 63. The auxiliary brake 63 is opened for a short time and is subsequently closed again so that a new tooth relation has been created in the claw clutch 4 and the shifting attempt can be repeated.

If the starting is to take place with a slightly rolling vehicle, for example, on an incline, then different rotational speeds exist at the transmission input shaft 2 and at the output shaft 5. A shifting or engagement of the claw clutch 4 can therefore not yet be carried out. If the corresponding rotational speed-measuring devices 16 and 17 indicate to the synchronziing control device 18 the existence of different rotational speeds, then, if present, at first the clutch 12 between the transmission input shaft 2 and the turbine shaft 11 has to be closed which takes place by engagement or tightening of the auxiliary brake 63 in the manner described hereinabove. Thereafter, the auxiliary brake 63 is opened slowly until the rotational speed of the transmission input shaft 2 corresponds to the rotational speed of the transmission output shaft 5 and the engagement of the claw clutch 4 can be carried out.

For purposes of shifting from first into the second speed, the shifting lever 19 is shifted in a corresponding manner. The contact 62 of the shifting lever 19 wipes in its center position at first the contact 21 which is connected with the synchronizing control device 18, which in turn then produces a signal to the servo-slide valve 42 that initiates an actuation of the servo-piston 50. Pressure medium is now supplied to the servo-piston 50 by way of the line 44, whereas the line 43 acting on the opposite piston side is relieved or vented. In order to disengage the claws of the claw clutch 4, the engine output has to be so adjusted that the tractive moment of the engine is approximately balanced. This takes place by way of the adjusting mechanism 26 of the injection pump 27. After the shifting claws are unloaded, the claw clutch 4 can be opened. As soon as the shifting lever 53 has reached its center position and has released the check-back contact 57, the previously loaded line 44 is again relieved by the servo-slide valve 42. The shifting movement is thereby interrupted. Depending on the rotational speeds of the transmission input shaft 2 and of the output shaft 5, the adjusting mechanism 26 of the injection pump 27 or the adjusting mechanism 34 of the engine brake is actuated, depending on requirement, in the sense that the rotational speeds between the transmission input shaft 2 and the output shaft 5 become the same. Thereafter the synchronizing control device 18 again gives a signal to the servo-slide valve 42 whereby the line 44 is fed with pressure and the shifting operation is completed. The completion of the shifting operation is again confirmed to the synchronizing control device 18 by the check-back contact 56.

For all shifting operations, the driver only needs to shift the shifting lever 19 into the corresponding position whereas the synchronization installation according to the present invention then automatically carries out the shifting operations, properly speaking, whereby according to the present invention, all operations take place in the logical sequence. The driver need not do anything further since the synchronization is realized with the aid of corresponding controls of the engine and of the transmission elements.

In order to economize fuel, the claw clutch 13 serving as bridging clutch between the pump shaft and the turbine shaft 11 of the hydraulic torque converter 7 may be engaged. For that purpose, the rotational speed-measuring device 14 produces at a predetermined preselected engine rotational speed a signal to the synchronizing control device 18. Upon exceeding this control rotational speed, the injection is taken back for a short period of time to idling by the adjusting mechanism 26 of the injection pump 27 so that the engine rotational speed and therewith the pump shaft rotational speed decreases. Upon equality of the rotational speeds of pump shaft and turbine shaft 11, which is determined by the rotational speed-measuring devices 14 and 15, the engagement of the claw clutch 13 can be realized by way of the servo-slide valve 42 and the corresponding line 47 and the servo-piston 48.

The possibility exists in standstill that the entire drive between the engine and the rear axle is locked. In that case, it is hardly possible to disengage a speed in the manner described above. If therefore during standstill of the vehicle a shifting operation is to be undertaken, i.e., the rotational speed-measuring device 17 at the transmission output shaft 5 indicates the rotational speed zero, then at first the engine is adjusted by way of the adjusting mechanism 34 of the engine brake 36 to a speed below idling. In this condition, the hydraulic pump wheel moment now becomes disappearingly small. The claw clutch 4 can therefore be disengaged with the aid of the lines 43 and 44. A further shifting of the main transmission is then possible thereafter in the manner described.

The synchronization installation according to the present invention, described hereinabove, may also be utilized without any difficulties with transmissions which have more than two speeds. It is also possible, in lieu of the hydraulic torque converter 7 to provide a correspondingly large mechanical friction clutch if one is willing to accept the aforementioned disadvantages.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A synchronization installation for change-speed transmissions for an engine having a drive shaft comprising: a plurality of rotatable transmission elements in said transmission including an input shaft and an output shaft; an electronic synchronizing control means; a multi-position preselector means operatively connected to said synchronizing control means for controlling the operation thereof; shifting clutch means for selectively engaging and disengaging said transmission elements; servo-shifting means for operatively connecting said synchronizing control means with said shifting clutch means, said shifting clutch means being actuated by said servo-shifting means at substantial rotational speed equality of said rotatable transmission elements; said synchronizing control means including means for measuring the rotational speed of the drive shaft, said transmission input shaft, said transmission output shaft and adjustment means for increasing or decreasing the rotational speed of the engine including means for adjusting the supply of fuel to the engine to increase or decrease the rotational speed of the engine and means for directly braking the engine.

2. A synchronization installation according to claims 1, wherein said fuel supply adjusting means includes an electromagnetic adjusting mechanism.

3. A synchronization installation according to claim 1, wherein said means for directly braking the engine includes an electromagnetic adjusting mechanism.

4. A synchronization installation according to claim 1, wherein said shifting means includes a servo-slide valve means controlled by said synchronizing control means, shifting lever means for shifting said shifting clutch means, and servo-piston means operatively connecting said servo-slide valve means with said shifting lever means.

5. A synchronization installation according to claim 4, wherein said shifting lever means include check-back contact means for indicating the engaged position thereof connected with said synchronizing control means.

6. A synchronization installation according to claim 1, wherein said preselector means includes a shift lever provided with contact means for indicating the position thereof connected with said synchronizing control means.

7. A synchronization installation according to claim 6, wherein said shift lever is displaceable between a center position and at least one additional position and wherein said shift lever in said center position abuts a contact means disengaging in this position said shifting clutch means by way of said synchronizing control means and said adjustment means.

8. A synchronization installation according to claim 1, wherein a hydraulic torque converter is operatively connected in the input of the transmission as starting coupling.

9. A synchronization installation according to claim 8, including a transmission input shaft, wherein said hydraulic torque converter includes a turbine shaft and a rigid mechanical connecting means for connecting said turbine shaft and said transmission input shaft is provided.

10. A synchronization installing according to claim 8, including a transmission input shaft, wherein a shifting clutch means is arranged between said hydraulic torque converter and said transmission input shaft.

11. A synchronization installation according to claim 10, wherein said last-mentioned clutch means includes a locking clutch.

12. A synchronization installation according to claim 8, wherein said hydraulic torque converter includes a turbine shaft and a pump shaft, said turbine shaft and said pump shaft both include means for measuring rotational speed, said turbine shaft and said pump shaft are connected by connecting means actuatable by said synchronizing control means by way of said shifting means.

13. A synchronization installation according to claim 12, wherein said connecting means includes a shifting clutch means.

14. A synchronization installation according to claim 8, wherein said hydraulic torque converter includes a turbine shaft and a brake means actuable by said synchronizing control means by way of said servo-shifting means to selectively brake said turbine shaft.

15. A synchronization installation according to claim 14, wherein said last-mentioned brake means is a band brake.

16. A synchronization installation according to claim 14, wherein a rigid mechanical connecting means for connecting said turbine shaft and said transmission input shaft is provided.

17. A synchronization installation according to claim 14, wherein a shifting clutch means is arranged between said hydraulic torque converter and said transmission input shaft.

18. A synchronization installation according to claim 17, wherein said last-mentioned clutch means includes a locking clutch.

19. A synchronization installation according to claim 18, wherein said hydraulic torque converter includes a pump shaft, said pump shaft and said turbine shaft both include means for measuring rotational speed, said pump shaft and said turbine shaft are connected by connecting means actuable by said synchronizing control means by way of said servo-shifting means.

20. A synchronization installation according to claim 19, wherein said connecting means includes a shifting clutch means.

21. A synchronization installation according to claim 20, wherein said fuel supply adjusting means includes an electromagnetic adjusting mechanism.

22. A synchronization installation according to claim 20, wherein said means for directly braking the engine includes an electromagnetic adjusting mechanism.

23. A synchronization installation according to claim 20, wherein said servo-shifting means includes a servo-slide valve means controlled by said synchronizing control means, shifting lever means for shifting said shifting clutch means, and servo-piston means operatively connecting said servo-slide valve means with said shifting lever means.

24. A synchronization installation according to claim 23, wherein said shifting lever means include check-back contact means for indicating the engaged position thereof connected with said synchronizing control means.

25. A synchronization installation according to claim 24, wherein said preselector means includes a shift lever provided with contact means for indicating the position thereof connected with said synchronizing control means.

26. A synchronization installation according to claim 25, wherein said shift lever is displaceable between a center position and at least one additional position and wherein said shift lever in said center position abuts a center contact means disengaging in this position said shifting clutch means by way of said synchronizing control means and said adjustment means.

27. A synchronization installation according to claim 26, wherein said adjustment means includes electromagnetic adjusting mechanisms.

* * * * *